United States Patent
Kiyoura et al.

(10) Patent No.: US 6,192,011 B1
(45) Date of Patent: Feb. 20, 2001

(54) GAIN CONTROLLING APPARATUS AND METHOD, INFORMATION REPRODUCING APPARATUS AND METHOD, AND INFORMATION RECORDING APPARATUS AND METHOD

(75) Inventors: Kazuhiro Kiyoura, Kawagoe; Toshiyuki Suzuki, Tendo; Takeshi Matsumoto, Kawagoe; Hiroshi Kitagawa, Kawagoe; Takehiro Takada, Kawagoe; Kazunori Saitoh, Tendo, all of (JP)

(73) Assignees: Pioneer Corporation, Tokyo (JP); Tohoku Pioneer Corporation, Yamagata (JP)

( * ) Notice: Under 35 U.S.C. 154(b), the term of this patent shall be extended for 0 days.

(21) Appl. No.: 09/443,137

(22) Filed: Nov. 19, 1999

(30) Foreign Application Priority Data

Nov. 20, 1998  (JP) .................................................. 10-331443

(51) Int. Cl.[7] ........................................................ G11B 7/00
(52) U.S. Cl. ........................ 369/44.29; 369/54; 369/44.25
(58) Field of Search .............................. 369/44.34, 44.35, 369/44.29, 44.27, 44.25, 54

(56) References Cited

U.S. PATENT DOCUMENTS 6,101,157 * 6/1998 Bradshaw et al. ................ 369/44.36

* cited by examiner

Primary Examiner—Nabil Hindi
(74) Attorney, Agent, or Firm—Young & Thompson (57) ABSTRACT

A gain controlling apparatus is provided with: an adjusting device (6, 7, 8) for adjusting a gain of a generation signal, which is generated on the basis of a light reception signal obtained by receiving a reflection light of a light beam from an information recording medium (1); and a detecting device (21, 14, 16) for detecting whether or not the generation signal is generated and outputting a detection signal when the generation signal is generated. The gain controlling apparatus is also provided with a controlling device (18) for controlling the adjusting device to increase the gain by a predetermined value set in advance when the detection signal is not outputted by the detecting device.

18 Claims, 7 Drawing Sheets

GAIN CONTROLLING APPARATUS AND METHOD, INFORMATION REPRODUCING APPARATUS AND METHOD, AND INFORMATION RECORDING APPARATUS AND METHOD

BACKGROUND OF THE INVENTION

1. Field of the Invention

The present invention relates to a gain controlling apparatus and a gain controlling method, an information reproducing apparatus having the gain controlling apparatus and an information reproducing method having the gain controlling method, and an information recording apparatus having the gain controlling apparatus and an information recording method having the gain controlling method. More particularly, the present invention relates to a gain controlling apparatus for controlling a gain of a signal used for a reproducing control or a recording control when at least one of an information reproducing operation and an information recording operation is optically carried out from and onto an information recording medium such as an optical disc and the like, and a gain controlling method for controlling it, an information reproducing apparatus having the gain controlling apparatus and an information reproducing method having the gain controlling method, and an information recording apparatus having the gain controlling apparatus and an information recording method having the gain controlling method.

2. Description of the Related Art

Conventionally, if information is optically reproduced or recorded as mentioned above, a light beam, such as a laser light for the reproduction or the record and the like, is irradiated onto an information recording medium such as an optical disc or the like, and then a signal generated by receiving its reflection light is used to usually carry out various controls or reproducing processes or recording processes.

More concretely, the conventional information reproducing apparatus or information recording apparatus has the following configuration. For example, a light reception signal generated by receiving the reflection light is processed to generate a so-called focus error signal (namely, a focus error signal indicative of a deviation in a direction perpendicular to an information recording medium at a focal position of a light beam) or a tracking error signal (namely, a tracking error signal indicative of a deviation in a direction parallel to the information recording medium at a focal point of a light beam). Based on this, the focal point is servo-controlled in the perpendicular or parallel direction to accurately reproduce or record the information.

In this case, the respective servo controls are carried out by optimizing a gain (or a sensibility) in the focus error signal or the tracking error signal in response to a strength of the obtained reflection light. Here, the reason why the gain is optimized is that the extremely high gains of the respective error signals may cause the mechanism of the servo control to oscillate in the worst case. Thus, the servo control cannot be carried out. On the other hand, the extremely low gains may disable the respective error signals to function as the error signals.

Even if the information is reproduced on the basis of a reproduction signal generated by receiving the reflection light (actually, on the basis of a reproduction RF (Radio Frequency) signal corresponding to the information recorded on an information recording medium and the like), it is usual to adjust a gain of the reproduction signal so as to be suitable for the reproducing process.

Here, as an actual example of the above mentioned optical disc, there is an optical disc which allows recording or reproducing operations for a plurality of times and which is so-called as a CD-RW (Compact Disc-Rewritable), in addition to a conventional CD.

However, according to the above mentioned CD-RW, the intensity of the reflection light, which is obtained by irradiating a light beam onto the CD-RW, is much lower than (e.g., about 12 dB lower than) that of the conventional CD.

Therefore, if it is tried to reproduce the CD-RW by using a conventional information reproducing apparatus for the conventional CD or to record the information onto the CD-RW by using the conventional information recording apparatus, a light reception signal (i.e., a light reception signal obtained by receiving the reflection light from the CD-RW), which has an enough level for the various servo controls as aforementioned, cannot be obtained. This result in that the information cannot be recorded onto the CD-RW, or the information cannot be reproduced from the CD-RW, which is a problem.

SUMMARY OF THE INVENTION

The present invention is proposed in view of the above mentioned problem. It is therefore an object of the present invention to provide a gain controlling apparatus and method, an information reproducing apparatus and method and an information recording apparatus and method, by which it is possible to record or reproduce the information onto or from the information recording medium even if the intensity of the reflection light of the light beam from the information recording medium is extremely weak.

The above object of the present invention can be achieved by a gain controlling apparatus provided with: an adjusting device such as a pre-amplifier or the like for adjusting a gain of a generation signal, which is generated on the basis of a light reception signal obtained by receiving a reflection light of a light beam from an information recording medium such as an optical disc or the like; a detecting device such as an AND circuit or the like for detecting whether or not the generation signal is generated and outputting a detection signal when the generation signal is generated; and a controlling device such as a CPU or the like for controlling the adjusting device to increase the gain by a predetermined value set in advance when the detection signal is not outputted by the detecting device.

According to the gain controlling apparatus of the present invention, the gain at the adjusting device is increased when the detection signal is not outputted as the intensity of the reflection light is weak. Therefore, it is possible to output the generation signal even in case of reproducing or recording the information recording medium, in which the generation signal is hardly detected because the gain of the generation signal is too small due to the weak intensity of the reflection light.

Also, since the gain at the adjusting device is just increased when the detection signal is not outputted, it is possible to output the generation signal from an information recording medium, for which the gain is small, without performing a complicated process.

In this manner, it is possible to reproduce or record the information from the information recording medium, the intensity of the reflection light from which is relatively weak, while treating this information recording medium (e.g., a CD-RW) in the same manner as the conventional information recording medium (e.g., a CD), the intensity of the reflection light from which is relatively strong.

In one aspect of the gain controlling apparatus of the present invention, the predetermined value is a constant value.

According to this aspect, since the gain is increased just by using the constant value, it is possible to output the generation signal by adjusting the gain speedily with a relatively simple configuration.

In another aspect of the gain controlling apparatus of the present invention, the detecting device outputs the detection signal when a level of the generation signal is higher than a predetermined threshold value.

According to this aspect, it is possible to output the detection signal, which precisely indicates the presence or the absence of the generation signal in correspondence with the level of the generation signal, by use of a relatively simple configuration.

In another aspect of the gain controlling apparatus of the present invention, the controlling device controls the adjusting device to increase the gain when a condition, in which the detection signal is not outputted, continues for a predetermined time duration.

According to this aspect, it is possible to control the gain at the adjusting device immediately when the output signal is outputted before the elapse of the predetermined time duration (e.g., 2 or 3 sec.) has elapsed, and it is possible to control the gain at the adjusting device after surely confirming a fact that the detection signal is not outputted.

In another aspect of the gain controlling apparatus of the present invention, the controlling device controls the adjusting device to increase the gain when a condition, in which the detection signal is not outputted, continues for a predetermined number of times of detection by the detecting device.

According to this aspect, it is possible to control the gain at the adjusting device immediately when the output signal is outputted before the elapse of the predetermined number of times, and it is possible to control the gain at the adjusting device after surely confirming a fact that the detection signal is not outputted.

In another aspect of the gain controlling apparatus of the present invention, the generation signal comprises a reproduction signal corresponding to the information recorded on the information recording medium.

According to this aspect it is possible to increase the gain precisely in corresponding to the intensity of the reflection light from the information recording medium since the gain is increased at the adjusting device on the basis of the presence or absence of the reproduction signal generated from the light reception signal.

In another aspect of the gain controlling apparatus of the present invention, the generation signal comprises a focus error signal indicative of a deviation between a focal position of a light beam and a position of the information recording medium in a direction perpendicular to the information recording medium.

According to this aspect it is possible to increase the gain precisely in corresponding to the intensity of the reflection light from the information recording medium since the gain is increased at the adjusting device on the basis of the presence or absence of the focus error signal generated from the light reception signal.

The above object of the present invention can be also achieved by an information reproducing apparatus provided with (i) the above described gain controlling apparatus of the present invention (including its various aspects), (ii) an optical pickup device such as an optical pickup or the like for irradiating the light beam onto the information recording medium and receiving the reflection light to thereby output the light reception signal, (iii) a signal generating device such as an adder or the like for generating the generation signal on the basis of the light reception signal outputted by the optical pickup device, and (iv) a reproduction controlling device such as a CPU or the like for controlling a reproduction of the information in accordance with the generation signal, the gain of which is adjusted by the adjusting device.

According to the information reproducing apparatus of the present invention, it is possible to reproduce the information from the information recording medium, the intensity of the reflection light from which is too weak to detect the generation signal since the detection signal and the gain of the generation signal are too small, by appropriately obtaining the generation signal, while treating this information recording medium (e.g., a CD-RW) in the same manner as the conventional information recording medium (e.g., a CD), the intensity of the reflection light from which is relatively strong.

The above object of the present invention can be also achieved by an information recording apparatus provided with (i) the above described gain controlling apparatus of the present invention (including its various aspects) (ii) an optical pickup device for irradiating the light beam onto the information recording medium and receiving the reflection light to thereby output the light reception signal, (iii) a signal generating device for generating the generation signal on the basis of the light reception signal outputted by the optical pickup device, (iv) a reproducing device for reproducing the information from the information recording medium on the basis of the generation signal, the gain of which is adjusted by the adjusting device, and (v) a recording device for processing record information, which is to be recorded onto the information recording medium, on the basis of the reproduced information and recording the processed record information onto the information recording medium.

According to the information recording apparatus of the present invention, it is possible to reproduce the information from the information recording medium, the intensity of the reflection light from which is too weak to detect the generation signal since the detection signal and the gain of the generation signal are too small, by appropriately obtaining the generation signal, and to thereby record the information onto the information recording medium on the basis of the reproduced information, while treating this information recording medium (e.g., a CD-RW) in the same manner as the conventional information recording medium (e.g., a CD), the intensity of the reflection light from which is relatively strong.

The above object of the present invention can be also achieved by a gain controlling method including: an adjusting process of adjusting a gain of a generation signal, which is generated on the basis of a light reception signal obtained by receiving a reflection light of a light beam from an information recording medium; a detecting process of detecting whether or not the generation signal is generated and outputting a detection signal when the generation signal is generated; and a controlling process of controlling the adjusting process to increase the gain by a predetermined value set in advance when the detection signal is not outputted by the detecting process.

According to the gain controlling method of the present invention, the gain at the adjusting process is increased when the detection signal is not outputted as the intensity of the reflection light is weak. Therefore, it is possible to output the generation signal even in case of reproducing or recording the information recording medium, in which the generation signal is hardly detected because the gain of the generation signal is too small due to the weak intensity of the reflection light.

Also, since the gain at the adjusting process is just increased when the detection signal is not outputted, it is possible to output the generation signal from an information recording medium, for which the gain is small, without performing a complicated process.

In this manner, it is possible to reproduce or record the information from the information recording medium, the intensity of the reflection light from which is relatively weak, while treating this information recording medium (e.g., a CD-RW) in the same manner as the conventional information recording medium (e.g., a CD), the intensity of the reflection light from which is relatively strong.

In one aspect of the gain controlling method of the present invention, the predetermined value is a constant value.

According to this aspect, since the gain is increased just by using the constant value, it is possible to output the generation signal by adjusting the gain speedily with a relatively simple configuration.

In another aspect of the gain controlling method of the present invention, the detecting process outputs the detection signal when a level of the generation signal is higher than a predetermined threshold value.

According to this aspect, it is possible to output the detection signal, which precisely indicates the presence or the absence of the generation signal in correspondence with the level of the generation signal, by use of a relatively simple configuration.

In another aspect of the gain controlling method of the present invention, the controlling process controls the adjusting process to increase the gain when a condition, in which the detection signal is not outputted, continues for a predetermined time duration.

According to this aspect, it is possible to control the gain at the adjusting process immediately when the output signal is outputted before the elapse of the predetermined time duration (e.g., 2 or 3 sec.) has elapsed, and it is possible to control the gain at the adjusting process after surely confirming a fact that the detection signal is not outputted.

In another aspect of the gain controlling method of the present invention, the controlling process controls the adjusting process to increase the gain when a condition, in which the detection signal is not outputted, continues for a predetermined number of times of detection by the detecting process.

According to this aspect, it is possible to control the gain at the adjusting process immediately when the output signal is outputted before the elapse of the predetermined number of times, and it is possible to control the gain at the adjusting process after surely confirming a fact that the detection signal is not outputted.

In another aspect of the gain controlling method of the present invention, the generation signal comprises a reproduction signal corresponding to the information recorded on the information recording medium.

According to this aspect it is possible to increase the gain precisely in corresponding to the intensity of the reflection light from the information recording medium since the gain is increased at the adjusting process on the basis of the presence or absence of the reproduction signal generated from the light reception signal.

In another aspect of the gain controlling method of the present invention, the generation signal comprises a focus error signal indicative of a deviation between a focal position of a light beam and a position of the information recording medium in a direction perpendicular to the information recording medium.

According to this aspect it is possible to increase the gain precisely in corresponding to the intensity of the reflection light from the information recording medium since the gain is increased at the adjusting process on the basis of the presence or absence of the focus error signal generated from the light reception signal.

The above object of the present invention can be also achieved by an information reproducing method including (i) the above described gain controlling method of the present invention (including its various aspect), (ii) an optical pickup process of irradiating the light beam onto the information recording medium and receiving the reflection light to thereby output the light reception signal, (iii) a signal generating process of generating the generation signal on the basis of the light reception signal outputted by the optical pickup process, and (iv) a reproduction controlling process of controlling a reproduction of the information in accordance with the generation signal, the gain of which is adjusted by the adjusting process.

According to the information reproducing method of the present invention, it is possible to reproduce the information from the information recording medium, the intensity of the reflection light from which is too weak to detect the generation signal since the detection signal and the gain of the generation signal are too small, by appropriately obtaining the generation signal, while treating this information recording medium (e.g., a CD-RW) in the same manner as the conventional information recording medium (e.g., a CD), the intensity of the reflection light from which is relatively strong.

The above object of the present invention can be also achieved by an information recording method including (i) the above described gain controlling method of the present invention (including its various aspect), (ii) an optical pickup process of irradiating the light beam onto the information recording medium and receiving the reflection light to thereby output the light reception signal, (iii) a signal generating process of generating the generation signal on the basis of the light reception signal outputted by the optical pickup process, (iv) a reproducing process of reproducing the information from the information recording medium on the basis of the generation signal, the gain of which is adjusted by the adjusting process, and (v) a recording process of processing record information, which is to be recorded onto the information recording medium, on the basis of the reproduced information and recording the processed record information onto the information recording medium.

According to the information recording method of the present invention, it is possible to reproduce the information from the information recording medium, the intensity of the reflection light from which is too weak to detect the generation signal since the detection signal and the gain of the generation signal are too small, by appropriately obtaining the generation signal, and to thereby record the information onto the information recording medium on the basis of the reproduced information, while treating this information recording medium (e.g., a CD-RW) in the same manner as the conventional information recording medium (e.g., a CD), the intensity of the reflection light from which is relatively strong.

The nature, utility, and further features of this invention will be more clearly apparent from the following detailed description with respect to preferred embodiments of the invention when read in conjunction with the accompanying drawings briefly described below.

DETAILED DESCRIPTION OF THE PREFERRED EMBODIMENTS

Preferred embodiments of the present invention will be explained below with reference to the drawings.

The following respective embodiments are the embodiment in which the present invention is applied to a gain control (in a first embodiment) in an information reproducing apparatus for reproducing the information recorded on a CD or CD-RW, or a gain control (in a second embodiment) in an information recording apparatus for recording the information onto the CD-RW.

(I) First Embodiment

At first, the first embodiment according to the present invention is described with reference to FIGS. 1 to 6.

Figure 1:
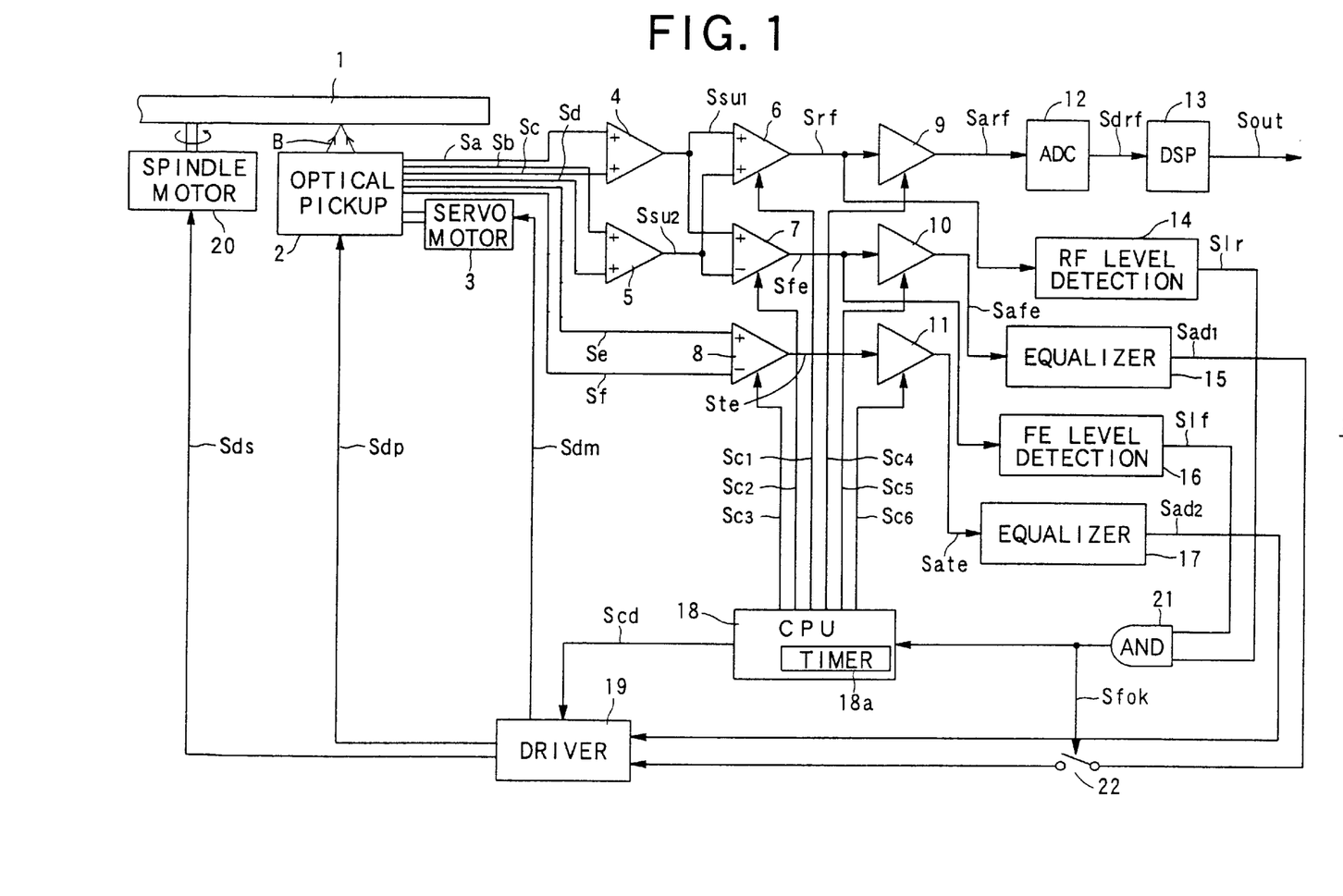
FIG. 1 is a block diagram showing a whole configuration of an information reproducing apparatus according to a first embodiment.
Figure 2:
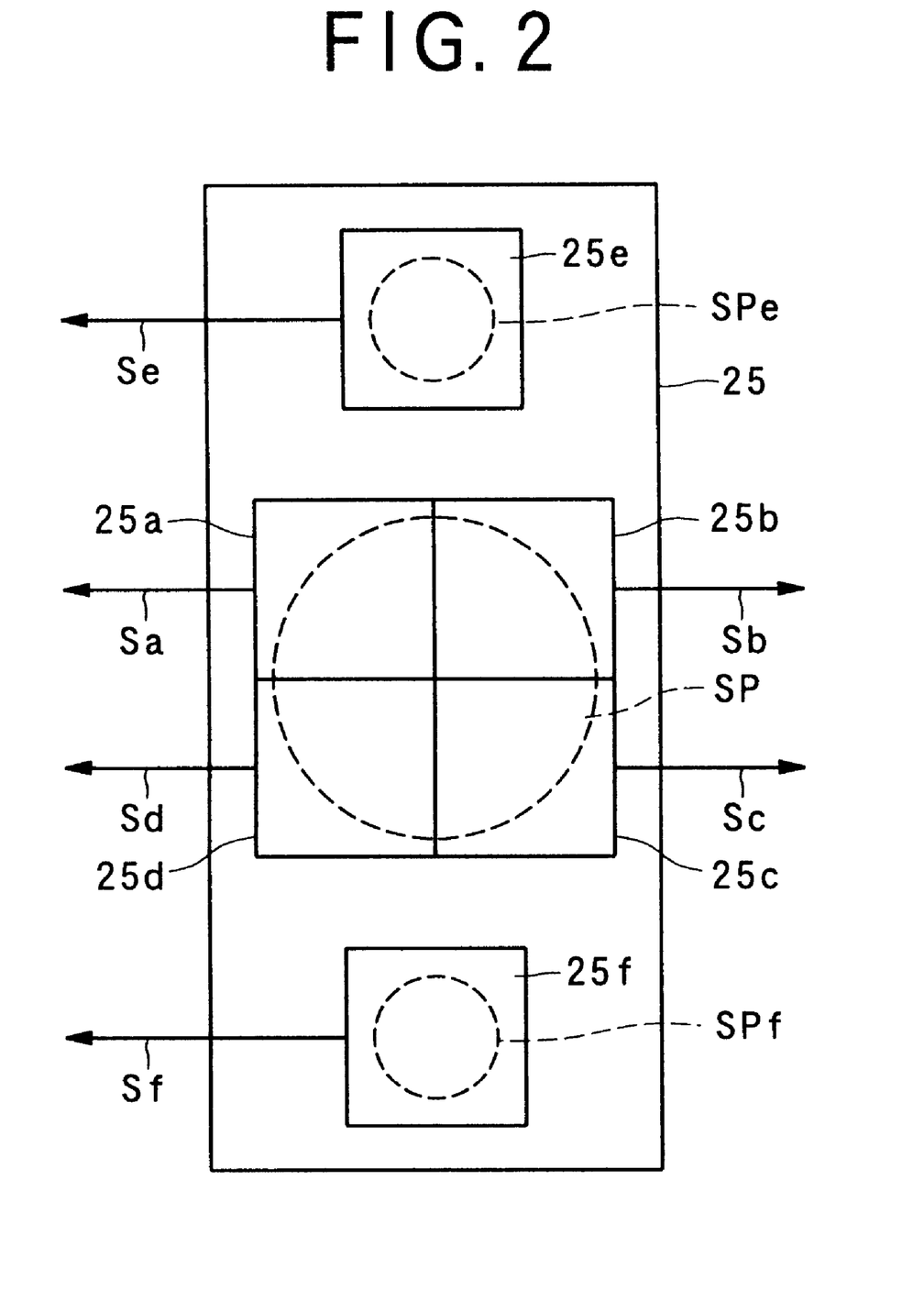
FIG. 2 is a plan view showing a configuration of a detector in the first embodiment.
Figure 3:
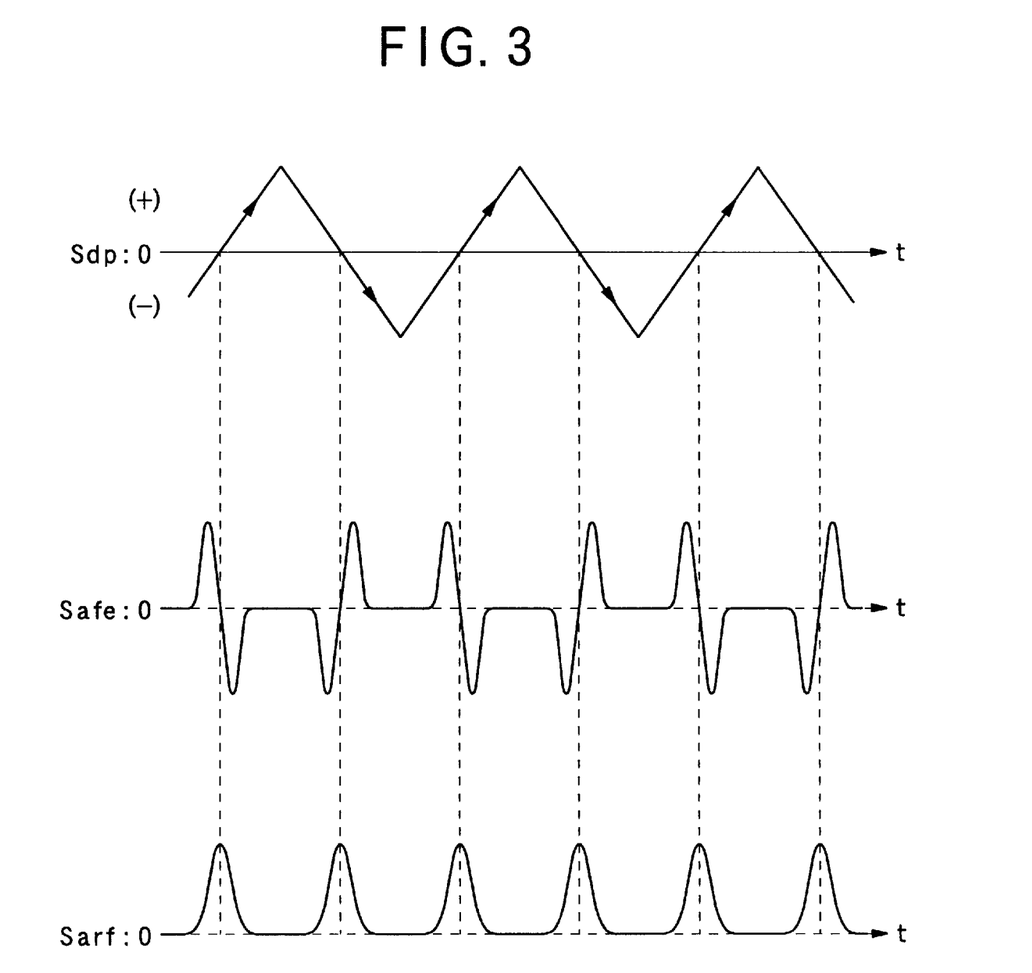
FIG. 3 is a timing chart showing waveforms of respective signals at a time of performing a focus search operation in the first embodiment.
Figure 4A:
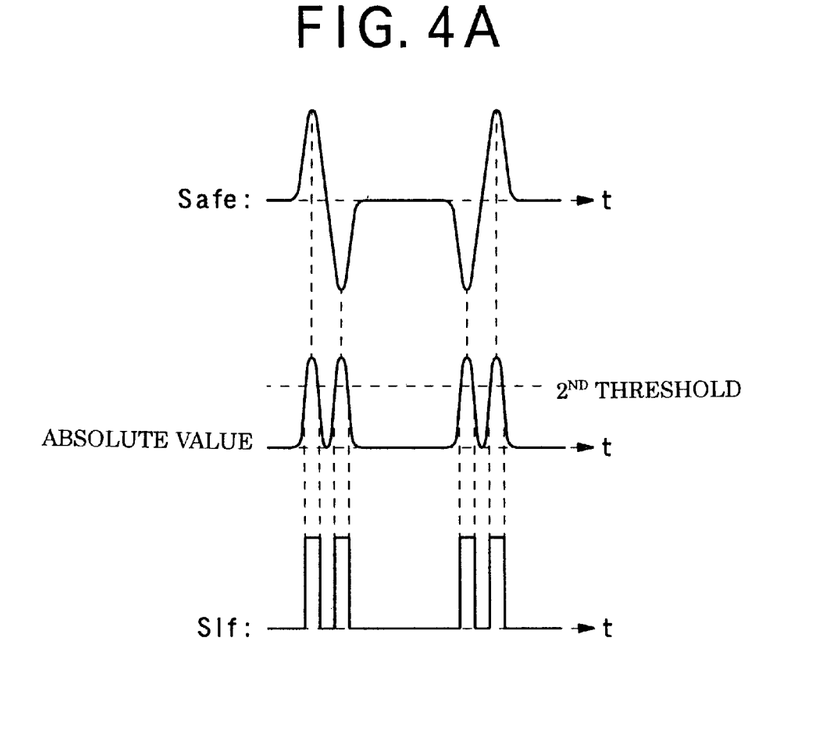
FIG. 4A is a timing chart showing an operation of an RF level detection circuit in the first embodiment.
Figure 4B:
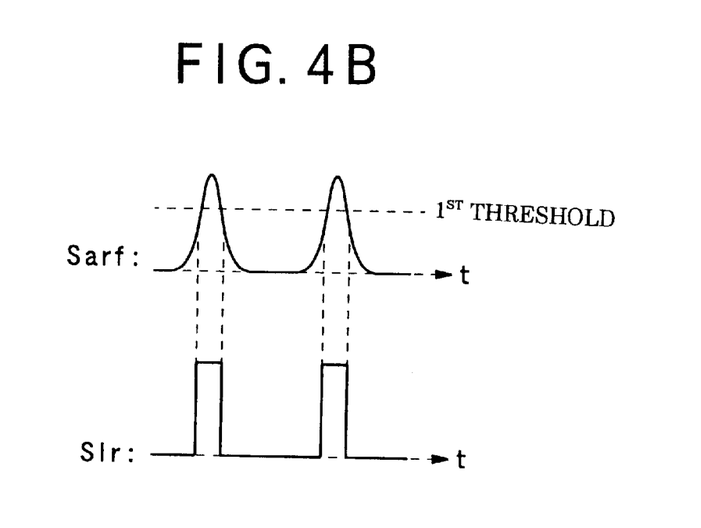
FIG. 4B is a timing chart showing an operation of an FE level detection circuit in the first embodiment.

At first, the whole configuration and the operations of the information reproducing apparatus according to the first embodiment are described with reference to FIG. 1 to FIG. 4. FIG. 1 is a block diagram showing the whole configuration of the information reproducing apparatus according to the first embodiment. FIG. 2 is a plan view showing a configuration of a detector in a later-described optical pickup. FIGS. 3, 4A and 4B are timing charts for explaining the operation of the information reproducing apparatus in the first embodiment.

As shown in FIG. 1, an information reproducing apparatus S according to the first embodiment is provided with: an optical pickup 2; a servo motor 3; adders 4 and 5 serving as generators; pre-amplifiers 6 to 8 serving as an adjusting device; variable amplifiers 9 to 11; an A/D (Analog/Digital) converter 12; a DSP (Digital Signal Processor) 13 serving as a reproducing device; an RF level detection circuit 14; equalizers 15 and 17; an FE (Focus Error) level detection circuit 16; a CPU 18 serving as a controlling device and a reproduction controlling device; a driver 19; a spindle motor 20; an AND circuit 21 as a detecting device; and a switch 22.

The CPU 18 contains therein a timer 18a.

The optical pickup 2 is provided with: a detector 25 having partial detectors 25a to 25f as shown in FIG. 2; a diode (not shown) for emitting a light beam B shown in FIG. 1; an objective lens (not shown) for collecting the emitted light beams B onto an optical disc 1 shown in FIG. 1, and so on.

Next, the whole operation will be described below.

The spindle motor 20 is driven in accordance with a later-described spindle drive signal Sds from the driver 19, and accordingly rotates the optical disc 1 serving as an information recording medium on which information to be reproduced is recorded, at a predetermined rotation number.

At this time, the optical pickup 2 irradiates the light beam B serving as a main beam used for the information reproduction and two sub-beams (which are not shown and are intended to carry out a tracking servo control by using a so-called three-beam method) onto the information record surface of the optical disc 1, respectively. The optical pickup 2 receives respective reflection lights by the detector 25, and further outputs light reception signals Sa to Sf.

In this case, as shown in FIG. 2, the optical pickup 2 receives the reflection light of the light beam B (to which astigmatism is given in advance through a cylindrical lens (not shown) or the like in the optical pickup 2, in order to perform a focus servo control by using a so-called astigmatism method) by the partial detectors 25a to 25d, to thereby output the light reception signals Sa to Sd. The optical pickup 2 also separately receives the respective sub-beams by the respective partial detectors 25e and 25f, to thereby output the respective light reception signals Se to Sf. At this time, the light beam B is emitted such that an irradiation range on the partial detectors 25a to 25d of the reflection lights is an irradiation range SP shown in FIG. 2. Also, the respective sub-beams are emitted such that an irradiation range on the partial detectors 25e and 25f of the reflection lights is irradiation ranges SPe and SPf respectively shown in FIG. 2. Then, the light reception signals Sa to Sd are used to generate a later-described reproduction RF signal Srf and a focus error signal Sfe (i.e., a focus error signal generated by the astigmatism method). On the other hand, the light reception signals Se and Sf are used to generate a later-described tracking error signal Ste.

Next, the adder 4 adds the light reception signals Sa and Sc to thereby generate an addition signal Ssu1, and then outputs it to one terminal of the pre-amplifier 6 and a normal terminal of the pre-amplifier 7, respectively.

In parallel with this, the adder 5 adds the light reception signals Sb and Sd to thereby generate an addition signal Ssu2, and then outputs it to the other terminal of the pre-amplifier 6 and an inversion terminal of the pre-amplifier 7, respectively.

Accordingly, the pre-amplifier 6 adds the addition signal Ssu1 and the addition signal Ssu2 to thereby generate the reproduction RF signal Srf corresponding to the information recorded on the optical disc 1, and then outputs it to the variable amplifier 9 and the RF level detection circuit 14. At this time, the pre-amplifier 6 roughly adjusts a gain of the reproduction RF signal Srf, in accordance with a later-described control signal Sc1 from the CPU 18.

On the other hand, the pre-amplifier 7 subtracts the addition signal Ssu2 from the addition signal Ssu1 to thereby generate the focus error signal Sfe for the focus servo control of the astigmatism method, and then outputs it to the variable amplifier 10 and the FE level detection circuit 16. At this time, the pre-amplifier 7 roughly adjusts a gain of the focus error signal Sfe, in accordance with a later-described control signal Sc2 from the CPU 18.

Moreover, the pre-amplifier 8 subtracts the light reception signal Sf from the light reception signal Se to thereby generate the tracking error signal Ste for the tracking servo control of the three-beam method, and then outputs it to the variable amplifier 11. At this time, the pre-amplifier 8 roughly adjusts a gain of the tracking error signal Ste, in accordance with a later-described control signal Sc3 from the CPU 18.

Next, the variable amplifier 9 finely adjusts the roughly-adjusted gain of the reproduction RF signal Srf, in accordance with a control signal Sc4 from the CPU 18 to thereby generate an adjusted RF signal Sarf, and then outputs it to the A/D converter 12.

After that, the A/D converter 12 digitizes the adjusted RF signal Sarf, to thereby generate a digital RF signal Sdrf, and then outputs it to the DSP 13. The DSP 13 applies a predetermined digital process on the digital RF signal Sdrf, to generate a digital output signal Sout to an external speaker (if the digital output signal Sout is an audio signal) which is not shown, an external image processor (if the digital output signal Sout is an image signal) which is not shown, or the like.

In parallel with this, the RF level detection circuit 14 detects whether or not an output level (e.g., a voltage level) of the reproduction RF signal Srf, which is outputted when the focus search operation (i.e., an operation for trying to move an objective tens within the optical pickup 2 in a direction perpendicular to the information recording surface of the optical disc 1 in order to detect an optimal position of the focal position of the light beam B at the time of actual information reproduction (in other words, a focal position on the information recording surface of the optical disc 1)) is performed while the gain control is being performed before the actual reproduction process, is higher than a later-described $1^{st}$ threshold. Then, the RF level detection circuit 14 generates a detection signal Slr only when the output level exceeds the $1^{st}$ threshold to thereby output it to one terminal of the AND circuit 21. The operation of this RF level detection circuit 14 will be described later in detail.

On the other hand, the variable amplifier 10 finely adjusts the roughly-adjusted gain of the focus error signal Sfe, in accordance with a later-described control signal Sc5 from the CPU 18 to thereby generate an adjusted focus error signal Safe, and then outputs it to the equalizer 15.

After that, the equalizer 15 applies a wave form shaping process on the adjusted focus error signal Safe to thereby generate a shaped focus error signal Sad1, which indicates a deviation in a direction perpendicular to the information record surface between the focal points of the light beam B and the respective sub-beams and the position of the information record surface of the optical disc 1. Then, the equalizer 15 outputs the shaped focus error signal Sad1 to the driver 19 through the switch 22.

In parallel with this, the FE level detection circuit 16 detects whether or not an output level (actually, a voltage level and the like) of the focus error signal Sfe exceeds a $2^{nd}$ threshold value while the gain control is performed as described later. Then, the FE detection circuit 16 generates a detection signal Slf only when this output level exceeds the $2^{nd}$ threshold value, and outputs the detection signal Slf to another input terminal of the AND circuit 21.

Accordingly, the AND circuit 21 generates a servo control start signal Sfok to start the focus servo control by closing the focus servo loop in the focus servo control operation by the driver 19 only when both of the detection signals Slr and Slf are outputted, and outputs it to the switch 22 and the CPU 18.

Then, the switch 22 is closed only when the servo control start signal Sfok is generated, so that the above mentioned focus servo loop including the equalizer 15, the driver 19 and the focus actuator for driving the objective lens within the optical pickup 2 in a direction perpendicular to the information record surface of the optical disc 1 is in its closed status.

On the other hand, the variable amplifier 11 finely adjusts the roughly-adjusted gain of the tracking error signal Ste, in accordance with a later-described control signal Sc6 from the CPU 18 to thereby generate an adjusted tracking error signal Sate, and then outputs it to the equalizer 17.

After that, the equalizer 17 applies the wave form shaping process on the adjusted tracking error signal Sate to thereby generate a shaped tracking error signal Sad2 indicative of a deviation in a radial direction of the optical disc 1 between the focal point of the light beam B and a position of a track on the information record surface of the optical disc 1, and then outputs it to the driver 19.

Next, at the time of performing the above mentioned focus search operation as well as the actual information reproducing operation, in accordance with the shaped focus error signal Sad1 and the shaped tracking error signal Sad2, the driver 19 generates an actuator drive signal Sdp for driving the objective lens (not shown) in the optical pickup 2 in the direction perpendicular to the information record surface of the optical disc 1 so that the shaped focus error signal Sad1 becomes at a zero level and also for driving the objective lens (not shown) in the optical pickup 2 in the radial direction of the optical disc 1 so that the shaped tracking error signal Sad2 becomes at the zero level, and then outputs it to the optical pickup 2, so as to carry out the focus servo control and the tracking servo control.

Incidentally, the driver 19 generates the above mentioned actuator drive signal Sdp to try to drive the objective lens in the direction perpendicular to the information record surface of the optical disc 1 when a later described control signal Scd is outputted from the CPU 18 at the time of the above mentioned focus search operation, and outputs it to the optical pickup 2.

In parallel with this, if only the operation of driving the objective lens is insufficient to set the shaped tracking error signal Sad2 at the zero level, the driver 19 generates a motor drive signal Sdm, which is to drive the servo motor 3 so as to move a carriage (not shown) supporting the optical pickup 2 in the radial direction of the optical disc 1, and then outputs it to the servo motor 3.

Moreover, the driver 19 generates the spindle drive signal Sds, which is to drive the spindle motor 20 at the predetermined rotation number and thereby rotate the optical disc 1, and then outputs it to the spindle motor 20.

Next, in accordance with the servo control start signal Sfok, the CPU 18 generates the control signals Sc1 to Sc6 for controlling the rough and fine adjustments to the gains of the respective signals in the respective pre-amplifiers 6 to 8 and the respective variable amplifiers 9 to 11 by using later-described gain control processes, and then outputs them to the respective pre-amplifiers 6 to 8 and the respective variable amplifier 9 to 11. At this time, the timer 18a measures the time duration since the focus servo control is started until the servo control start signal Sfok is inputted to the CPU 18. The CPU 18 performs a later described gain control process on the basis of this measured value.

In parallel with this, the CPU 18 carries out the control operations with regard to the whole information reproducing apparatus S, such as timing controls of the respective elements constituting the information reproducing apparatus S.

Next, the operation of the FE level detection circuit 16 is explained with reference to FIG. 3 and FIG. 4A.

As described above, the FE level detection circuit 16 detects whether or not the output level of the focus error signal Sfe exceeds the $2^{nd}$ threshold value when the focus search operation is executed at the time of the gain control before the actual information reproduction. Then, the FE level detection circuit 16 generates the detection signal Slg only when the output level exceeds the $2^{nd}$ threshold value.

Namely, at the time of focus search operation, the CPU 18 outputs the control signal Scd so as to reciprocate the objective lens in the direction perpendicular to the information record surface of the optical disc 1 in a trial manner. The driver 19 generates the actuator drive signal Sdp to drive the focus actuator, which has a waveform as shown in a top stage of FIG. 3, on the basis of this control signal Scd, and outputs it to the optical pickup 2. At this time, when the actuator drive signal Sdp is changed from minus to plus, the objective lens is moved toward the information record surface (i.e., in the upward direction in FIG. 1 in case of the information reproducing apparatus S shown in FIG. 1). On the other hand, when the actuator drive signal Sdp is changed from plus to minus, the objective lens is moved away from the information record surface (i.e., in the downward direction in FIG. 1 in case of the information reproducing apparatus S shown in FIG. 1).

Then, in case that the reflection light from the optical disc 1 has an enough intensity, the focus error signal Sfe having a waveform shown in a middle stage of FIG. 3 and the reproduction RF signal Srf shown in a bottom stage of FIG. 3 are generated as the focus actuator is driven by the actuator drive signal Sdp.

At this time, the focus error signal Sfe zero-crosses at a zero-cross timing of the actuator drive signal Sdp. The waveform of the focus error signal Sfe when the actuator drive signal Sdp is changed from minus to plus has an inverse polarity of that when the actuator drive signal Sdp is changed from plus to minus. On the other hand, the reproduction RF signal Srf becomes the minimum value at the zero-cross timing of the actuator drive signal Sdp, and has the waveform to be zero-level before and after that.

When the focus error signal Sfe is inputted to the FE level detection circuit 16, the FE level detection circuit 16 detects an absolute value of the inputted focus error signal Sfe and compares this detected absolute value (which has a waveform as shown in a middle stage of FIG. 4A) with the $2^{nd}$ threshold value which is set in advance. Then, only when the absolute value is higher than the $2^{nd}$ threshold value, the FE level detection circuit 16 outputs the detection signal Slf which has a waveform as shown in a bottom stage of FIG. 4A. Here, the $2^{nd}$ threshold value is set in advance so as to generate the detection signal Slf only when the focus error signal, which has such an output level that the focus servo control can be accurately performed, is outputted.

Next, the operation of the RF detection circuit 14 is explained with reference to FIG. 3 and FIG. 4B.

As described above, the RF level detection circuit 14 detects whether or not the output level of the reproduction RF signal Srf exceeds the $1^{st}$ threshold value when the focus search operation is performed at the time of gain control before the actual information reproduction. Then, only when the output level exceeds the $1^{st}$ threshold value, the RF level detection circuit 14 outputs the detection signal Slr.

Namely, at the time of focus search operation, if the reflection light from the optical disc 1 has an enough intensity, by the change of the actuator drive signal Sdp as shown in a top stage of FIG. 3, the reproduction RF signal Srf as shown in a bottom stage of FIG. 3 is generated.

Then, when the reproduction RF signal Srf, which has a waveform as shown in a top stage of FIG. 4B, is inputted to the RF level detection circuit 14, the RF level detection circuit 14 compares the reproduction RF signal Srf with the $1^{st}$ threshold value which is set in advance. Then, only when the reproduction RF signal Srf exceed the $1^{st}$ threshold value, the RF level detection circuit 14 outputs the detection signal Slr having a waveform as shown in a bottom stage of FIG. 4B. Here, the $1^{st}$ threshold value is set in advance so as to generate the detection signal Slr only when the reproduction RF signal Srf, which has such an output level that the focus servo control can be precisely started, is outputted.

By the operations of the FE level detection circuit 16 and the RF level detection circuit 14, when the servo start signal Sfok is outputted from the AND circuit 21, each of the reproduction RF signal Srf and the focus error signal Sfe has an enoughly high output level. Namely, the reflection light from the optical disc 1 has an enough intensity to reproduce the information by using the current gains of the pre-amplifiers 6 to 8.

Next, the reproducing process and the gain control process of the information reproducing apparatus S in the first embodiment will be described below with reference to FIGS. 5 to 6.

Figure 5:
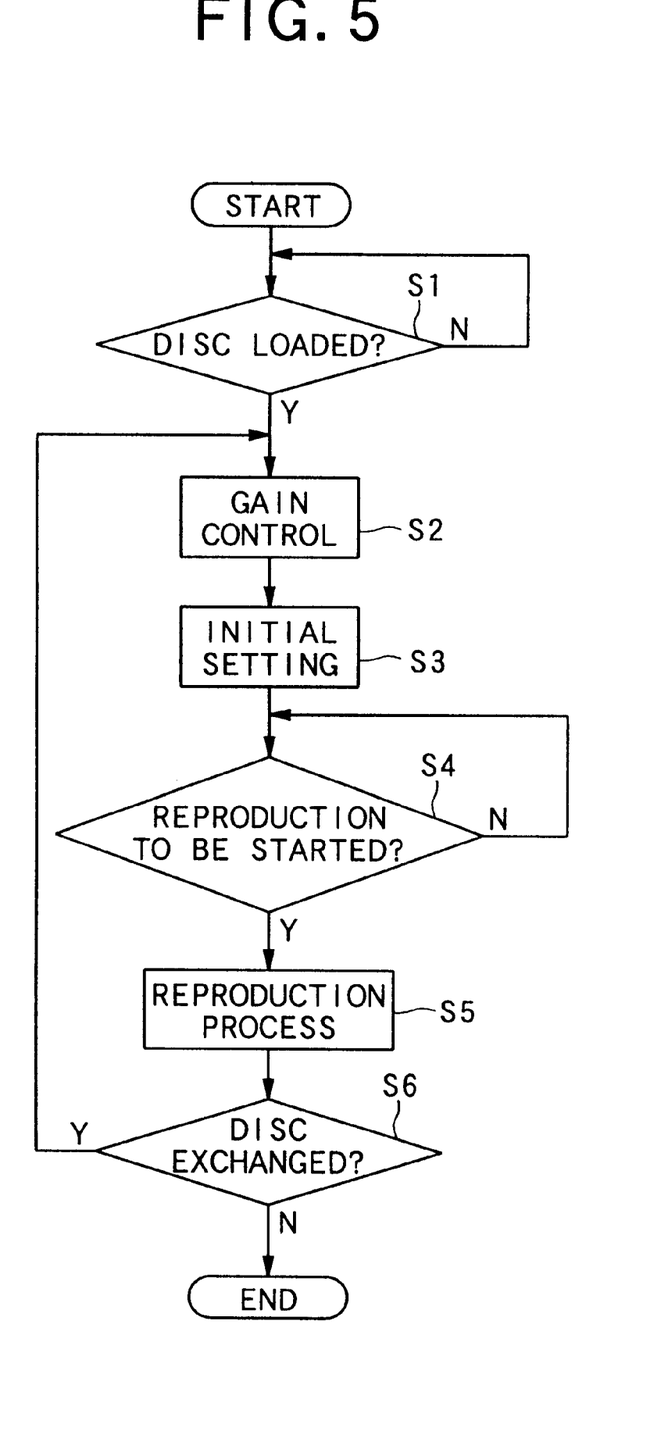
FIG. 5 is a flowchart showing a whole reproducing process in the first embodiment.
Figure 6:
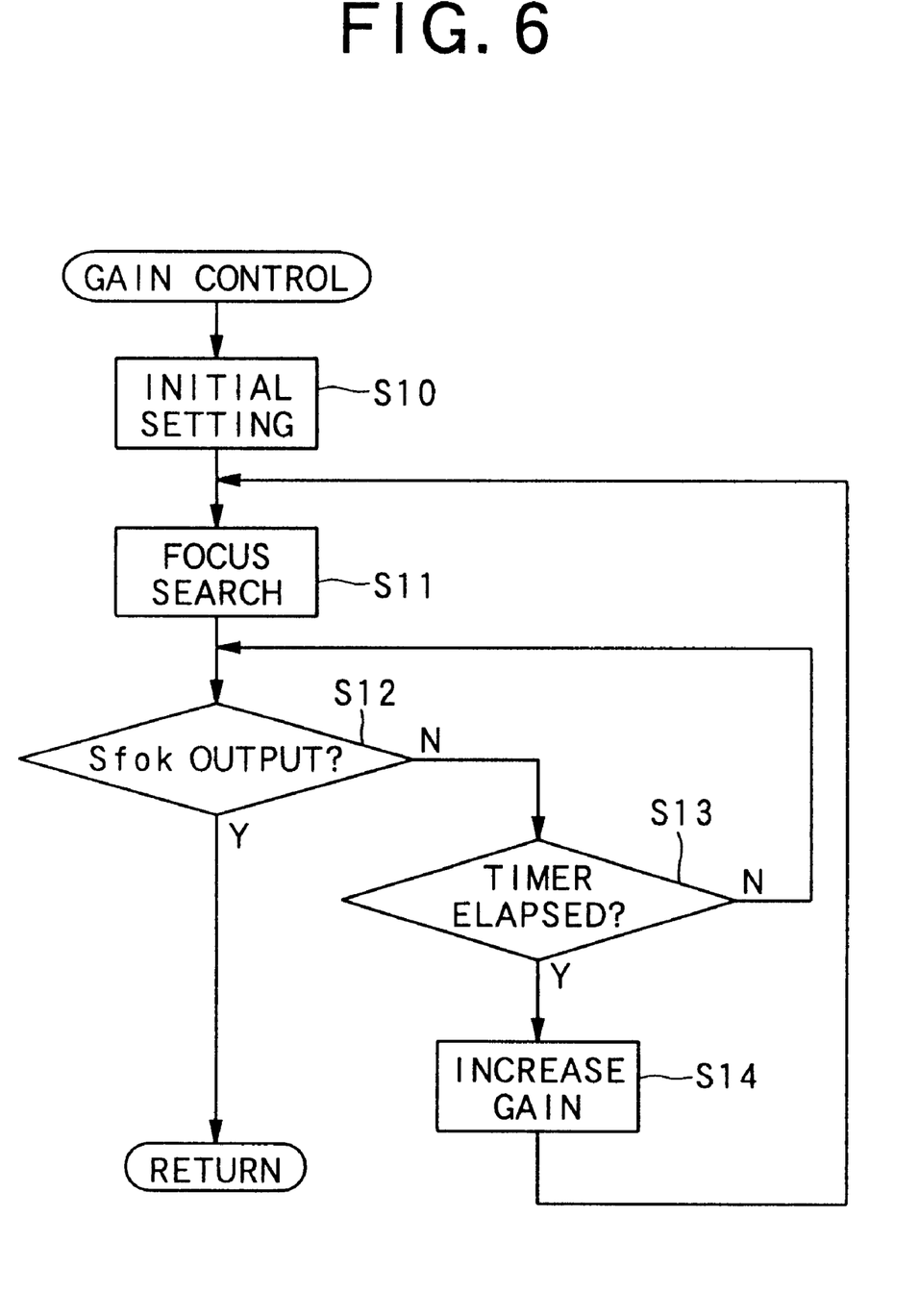
FIG. 6 is a flowchart showing a gain control process in the first embodiment.

FIG. 5 is a flowchart showing the whole of the reproducing process according to the first embodiment. FIG. 6 is a flowchart showing the detailed portions of the gain control process according to the first embodiment.

At first, the whole operations in the reproducing process are described with reference to FIG. 5.

In the reproducing process in the information reproducing apparatus S, it is firstly judged whether or not the optical disc 1 is loaded or inserted in the information reproducing apparatus S (Step S1). If it is not loaded (Step S1: NO), the operational flow waits for loading the optical disc 1 as it is. If it is loaded (Step S1: YES), the gain control process to control the gain of the preamplifiers 6 to 8 is performed (step S2). The detail portion of this gain control process will be described later.

Then, after the gain control is completed, for example, an operation of determining an attribute of the loaded optical disc 1 (e.g., determining whether the loaded optical disc is the CD or the CD-RW), an operation of reading out the information for initial setting from the optical disc 1 and the like are carried out by actually irradiating the light beam B onto the optical disc 1. Then, the initial setting of the information reproducing apparatus S as a whole is carried out in accordance with the read out information (Step S3). At the time of initial setting at the step S3, the light beam B and the sub beams are actually irradiated onto the optical disc 1, so that the gains for the rough adjustments in the respective pre-amplifier 6 to 8 are minutely set again on the basis of the reflection light thereof, and the gains for the fine adjustments in the respective variable amplifier 9 to 11 are also set.

Then, it is judged whether or not a start of a reproduction is instructed by an operation device (not shown) (Step S4). If it is not instructed (Step S4: NO), the operational flow waits for the instruction On the other hand, if it is instructed (Step S4: YES), the actual reproducing process is carried out by using the respective elements of the information reproducing apparatus S (Step S5).

Then, it is judged whether or not the optical disc 1 is exchanged after the completion of the reproduction (Step S6). If it is exchanged (Step S6: YES), the operational flow returns back to the step S2, so as to again start the reproducing process. On the other hand, if it is not exchanged (Step S6: NO), the reproducing process is ended as it is.

Here, the processes at the steps S2 and S3 among the above-mentioned respective processes are the process typically referred to as a setup process including them.

Next, the gain control process in the step S2 is explained in detail with reference to FIG. 6.

In the gain control process in the step S2, at first, the gains of the respective pre-amplifiers 6 to 8 are set as the initial values, which are set in advance (Step S10).

Next, in order to perform the above mentioned focus search operation, the CPU 18 generates the above mentioned control signal Scd. Accordingly, the driver 19 generates the actuator drive signal Sdp as shown in a top stage of FIG. 3 so as to reciprocate the objective lens in the direction perpendicular to the information record surface of the optical disc 1 in a trial manner (Step S11). The time measurement or clocking operation of the timer 18a within the CPU 18 is started from the timing of starting this focus search operation.

Then, as the focus search operation is executed, the focus error signal Sfe and the reproduction RF signal Srf as respectively shown in the middle and bottom stages of FIG. 3 are generated. By those generated signals, it is judged whether or not the servo control start signal Sfok is generated from the AND circuit 21 (Step S12). By this step S12, it is judged whether or not the focus error signal Sfe and the reproduction RF signal Srf each having the enough output level are generated i.e., whether or not the intensity of the reflection light from the optical disc 1 is enough to reproduce the information by use of the current gains of the pre-amplifiers 6 to 8.

Then, if the servo control start signal Sfok is generated (Step S12: YES), since the actual reproduction can be started as it is, the operation flow proceeds to the step S3 in FIG. 5. On the other hand, if the servo control start signal Sfok is not generated (Step S12: NO), it is judged whether or not a predetermine time has elapsed on the clocking of the timer 18a (Step S13). Here, this predetermined time is set to be such a time duration that the objective lens reciprocates for two or three times with respect to the focal point of the light beam B as a center in the focus serve operation (e.g., 2 to 3 sec. (seconds)) for example.

Then, if the predetermined time has never elapsed on the clocking of the timer 18a (Step S13: NO), the operation flow returns to the Step S12, so as to wait for the output of the servo control start signal Sfok until the elapse of this predetermined time.

On the other hand, if the predetermined time has elapsed while the servo control start signal Sfok is not outputted, (Step S13: YES), since the intensity of the reflection light is too weak to normally perform the information reproduction under the current gains of the respective preamplifiers 6 to 8, the gains of the respective pre-amplifiers 6 to 8 are increased by an amount of the gain value which is set in advance (Step S14). Then, the operation flow returns to the Step S11 again so as to judge whether or not the gain settings of the respective pre-amplifiers 6 to 8 are appropriate by performing the focus search operation again, and the processes on and after the Step S11 are performed. The gain value, which is set in advance in the Step S14, is +6 dB for each focus search operation, for example.

After that, it is repeated that each of the gains of the respective pre-amplifiers 6 to 8 is increased by +6 dB each time when the servo control start signal Sfok is not outputted.

As explained above, according to the gain control process in the information reproducing apparatus S of the first embodiment, when the servo control start signal Sfok, which indicates whether or not the reproduction RF signal Sr and the focus error signal Sfe are generated, is not outputted, the gains of the pre-amplifiers 6 to 8 are increased since the optical disc 1 is the CD-RW and thus the intensity of the reflection light is weak. Accordingly, even in case of the CD-RW, for which the generated gains of reproduction RF signal Sr and the focus error signal Sfe are small since the intensity of the reflection light is weak as compared with the conventional CD, it is possible to output the reproduction RF signal Srf and the focus error signal Sfe.

Therefore, even in case of the CD-RW, it is possible to reproduce the information while treating the optical disc in a similar manner as the conventional CD, whose intensity of the reflection light is strong.

Moreover, since the gains of the pre-amplifiers 6 to 8 are uniformly increased when the servo control start signal Sfok is not outputted, it is possible to output the adjusted RF signal Sarf and the adjusted focus error signal Safe from the CD-RW, whose gain is small, without performing a complicated control process.

As for the gain controls for the pre-amplifiers 6 to 8, since the gains are uniformly increased by always using the constant a value, it is possible to adjust the gains speedily by use of a simple configuration to thereby output the reproduction RF signal Srf and the focus error signal Sfe.

Furthermore, since the servo control start signal Sfok is outputted only when the level of the reproduction RF signal Srf and the focus error signal Sfe exceed the $1^{st}$ and $2^{nd}$ threshold values respectively, it is possible to output the servo control start signal Sfok, which indicates, in correspondence with the levels of the reproduction RF signal Srf and the focus error signal Sfe, the presence or absence thereof, by use of a rather simple configuration.

The gains are increased by the predetermined values when such a condition that the servo control start signal Sfok is not outputted continues for a predetermined time duration. Thus, when the servo control start signal Sfok is outputted before the elapse of the predetermined time duration, it is possible to immediately control the gains of the pre-amplifiers 6 to 8, and it is also possible to control the gains of the pre-amplifiers 6 to 8 after surely confirming the fact that the detection signal is not outputted.

Since the gains of the pre-amplifiers 6 to 8 are increased on the basis of the presence or absence of the reproduction RF signal Srf and the focus error signal Sfe, it is possible to increase the gains in correspondence with the intensity of the reflection light from the optical disc 1 precisely.

In the above described first embodiment, the gain controlling apparatus is constructed such that the servo control start signal Sfok is outputted only when both of the levels of the reproduction RF signal Sr and the focus error signal Sfe exceed the $1^{st}$ and $2^{nd}$ threshold values respectively. However, other than that, the gain controlling apparatus may be constructed such that the servo control start signal Sfok is outputted when at least one of the levels of the reproduction RF signal Sr and the focus error signal Sfe exceeds the $1^{st}$ or $2^{nd}$ threshold values respectively. In this case, in place of the AND circuit 21, a NOR circuit for outputting the servo control start signal Sfok when at least one of the levels of the reproduction RF signal Sr and the focus error signal Sfe exceeds the $1^{st}$ or $2^{nd}$ threshold values respectively is equipped to the gain controlling apparatus.

In the above described first embodiment, the gains are increased by the predetermined value when such a condition that the servo control start signal Sfok is not outputted continues for the predetermined time duration set in advance. Other than that, it is possible to increase the gains of the pre-amplifiers 6 to 8 when the servo control start signal Sfok is not outputted even if the focus search operation is repeatedly performed for a predetermined number of times set in advance. In this case, it is possible to control the gains of the pre-amplifiers 6 to 8 immediately when the servo control start signal Sfok is outputted before the focus search operation is repeatedly performed for the predetermined number of times, and it is also possible to control the gains of the pre-amplifiers 6 to 8 after surely confirming that the detection signal is not outputted.

Furthermore, since the gains are increased by the predetermined value when such a condition that the servo control start signal Sfok is outputted continues for the predetermined time duration set in advance, it is possible to control the gains of the pre-amplifiers 6 to 8 immediately when the servo control start signal Sfok is outputted before this predetermined time duration has elapsed, and it is also possible to control the gains of the pre-amplifiers 6 to 8 after surely confirming that the detection signal is not outputted.

(II) Second Embodiment

Figure 7:
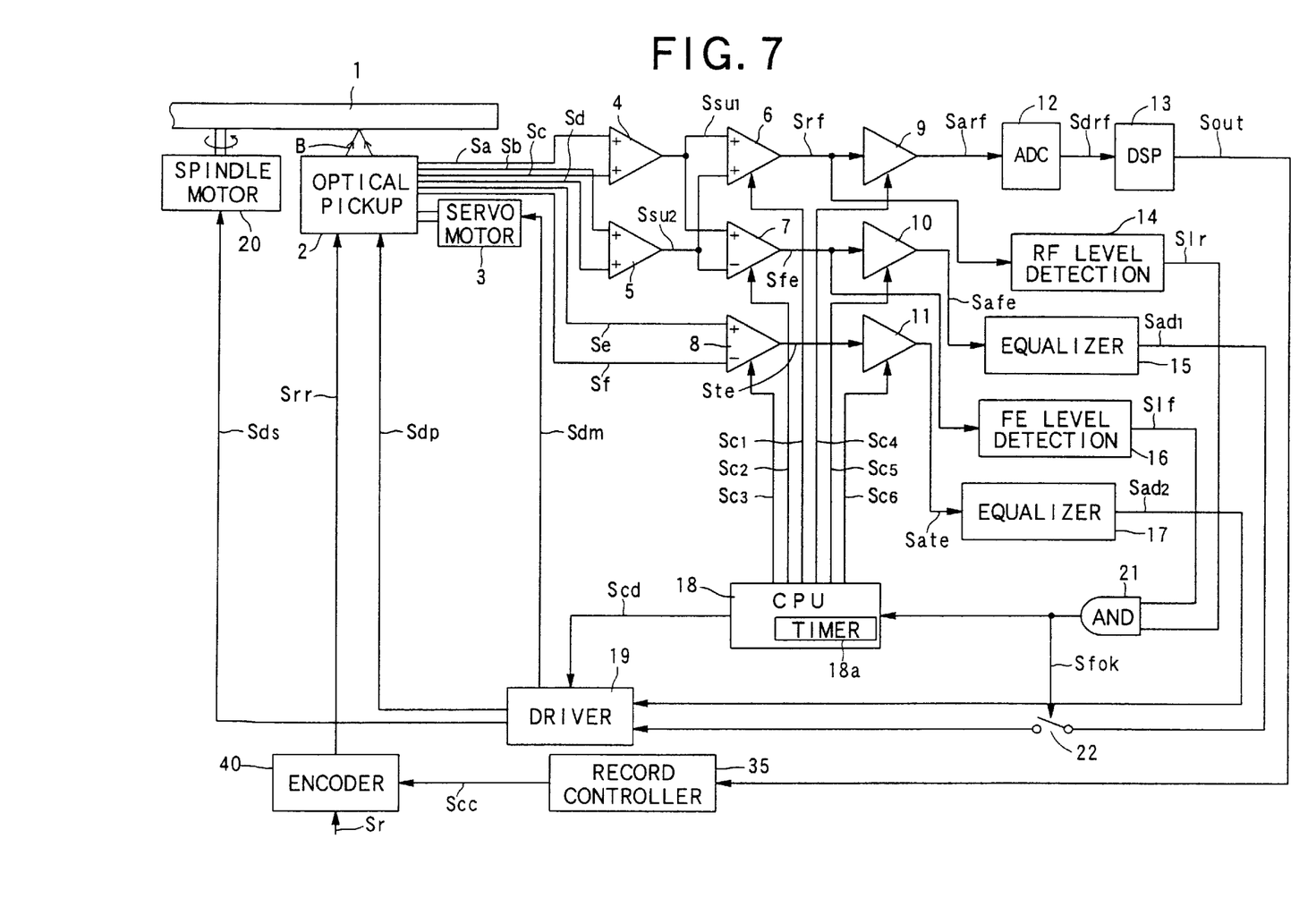
FIG. 7 is a block diagram showing a schematic configuration of an information recording apparatus according to a third embodiment.

A second embodiment of another embodiment according to the present invention will be described below with reference to FIG. 7. FIG. 7 is a block diagram showing the schematic configuration of an information recording apparatus according to the second embodiment.

In the first embodiment, the case is described in which the present invention is applied to the information reproducing apparatus for reproducing the information recorded on the optical disc 1. However, other than that case, if the optical disc 1 is the above-mentioned CD-RW, the present invention can be applied to an information recording apparatus which detects a record control signal recorded in advance on the CD-RW and then records the information onto the optical disc 1 that is the CD-RW, in accordance with the detected record control information.

This third embodiment is described with reference to FIG. 8, with regard to the case corresponding to the information reproducing apparatus S of the first embodiment.

In addition to the configuration of the information reproducing apparatus S in the first embodiment, an information recording apparatus R of the second embodiment is provided with: a record controller 35 for extracting record control information from a digital output signal Sout (in which the record control information is included) outputted from the DSP 13 and then outputs a record control signal Scc (which includes the address information on the optical disc 1 and the like) to an encoder 40; and the encoder 40 serving as a recording device for encoding record information Sr to be recorded, which is inputted from the external portion in accordance with the record control signal Scc, to thereby generate an encode signal Srr, and outputs it to a laser diode (not shown) in the optical pickup 2, and then controls it. An oscillation strength of the laser diode and the like in the optical pickup 2 is controlled in accordance with this encode signal Srr. Thus, an information pit corresponding to the record information Sr is formed on a position of the optical disc 1 indicated by the address information within the record control signal Scc. Hence, the record information Sr is recorded.

In FIG. 7, the same constitutional elements as those in the information reproducing apparatus S of the first embodiment shown in FIG. 1 carry the same reference numerals, and the detailed explanations thereof are omitted.

As mentioned above, according to the operations of the information recording apparatus R of the second embodiment, in addition to the effects due to the operations of the information reproducing apparatus S of the first embodiment, it is possible to record the record information onto the CD-RW.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description and all changes which come within the meaning and range of equivalency of the claims are therefore intended to be embraced therein.

The entire disclosure of Japanese Patent Application No.10-331443 filed on Nov. 20, 1998 including the specification, claims, drawings and summary is incorporated herein by reference in its entirety.

What is claimed is:

1. A gain controlling apparatus comprising:
   an adjusting device for adjusting a gain of a generation signal, which is generated on the basis of a light reception signal obtained by receiving a reflection light of a light beam from an information recording medium;
   a detecting device for detecting whether or not the generation signal is generated and outputting a detection signal when the generation signal is generated; and
   a controlling device for controlling said adjusting device to increase the gain by a predetermined value set in advance when the detection signal is not outputted after a predetermined time period by said detecting device.

2. A gain controlling apparatus according to claim 1, wherein the predetermined value is a constant value.

3. A gain controlling apparatus according to claim 1, wherein said detecting device outputs the detection signal when a level of the generation signal is higher than a predetermined threshold value.

4. A gain controlling apparatus according to claim 1, wherein said controlling device controls said adjusting device to increase the gain when a condition, in which the detection signal is not outputted, continues for a predetermined time duration.

5. A gain controlling apparatus according to claim 1, wherein said controlling device controls said adjusting device to increase the gain when a condition, in which the detection signal is not outputted, continues for a predetermined number of times of detection by said detecting device.

6. A gain controlling apparatus according to claim 1, wherein the generation signal comprises a reproduction signal corresponding to the information recorded on said information recording medium.

7. A gain controlling apparatus according to claim 1, wherein the generation signal comprises a focus error signal indicative of a deviation between a focal position of a light beam and a position of said information recording medium in a direction perpendicular to said information recording medium.

8. An information reproducing apparatus comprising
   (i) a gain controlling apparatus comprising:
      an adjusting device for adjusting a gain of a generation signal, which is generated on the basis of a light reception signal obtained by receiving a reflection light of a light beam from an information recording medium;
      a detecting device for detecting whether or not the generation signal is generated and outputting a detection signal when the generation signal is generated; and
      a controlling device for controlling said adjusting device to increase the gain by a predetermined value set in advance when the detection signal is not outputted after a predetermined time period by said detecting device,
   (ii) an optical pickup device for irradiating the light beam onto said information recording medium and receiving the reflection light to thereby output the light reception signal,
   (iii) a signal generating device for generating the generation signal on the basis of the light reception signal outputted by said optical pickup device, and (iv) a reproduction controlling device for controlling a reproduction of the information in accordance with the generation signal, the gain of which is adjusted by said adjusting device.

9. An information recording apparatus comprising
(i) a gain controlling apparatus comprising:
an adjusting device for adjusting a gain of a generation signal, which is generated on the basis of a light reception signal obtained by receiving a reflection light of a light beam from an information recording medium;
a detecting device for detecting whether or not the generation signal is generated and outputting a detection signal when the generation signal is generated; and
a controlling device for controlling said adjusting device to increase the gain by a predetermined value set in advance when the detection signal is not outputted after a predetermined time period by said detecting device,
(ii) an optical pickup device for irradiating the light beam onto said information recording medium and receiving the reflection light to thereby output the light reception signal,
(iii) a signal generating device for generating the generation signal on the basis of the light reception signal outputted by said optical pickup device,
(iv) a reproducing device for reproducing the information from said information recording medium on the basis of the generation signal, the gain of which is adjusted by said adjusting device, and
(v) a recording device for processing record information, which is to be recorded onto said information recording medium, on the basis of the reproduced information and recording the processed record information onto said information recording medium.

10. A gain controlling method comprising:
an adjusting process of adjusting a gain of a generation signal, which is generated on the basis of a light reception signal obtained by receiving a reflection light of a light beam from an information recording medium;
a detecting process of detecting whether or not the generation signal is generated and outputting a detection signal when the generation signal is generated; and
a controlling process of controlling said adjusting process to increase the gain by a predetermined value set in advance when the detection signal is not outputted after a predetermined time period by said detecting process.

11. A gain controlling method according to claim 10, wherein the predetermined value is a constant value.

12. A gain controlling method according to claim 10, wherein said detecting process outputs the detection signal when a level of the generation signal is higher than a predetermined threshold value.

13. A gain controlling method according to claim 10, wherein said controlling process controls said adjusting process to increase the gain when a condition, in which the detection signal is not outputted, continues for a predetermined time duration.

14. A gain controlling method according to claim 10, wherein said controlling process controls said adjusting process to increase the gain when a condition, in which the detection signal is not outputted, continues for a predetermined number of times of detection by said detecting process.

15. A gain controlling method according to claim 10, wherein the generation signal comprises a reproduction signal corresponding to the information recorded on said information recording medium.

16. A gain controlling method according to claim 10, wherein the generation signal comprises a focus error signal indicative of a deviation between a focal position of a light beam and a position of said information recording medium in a direction perpendicular to said information recording medium.

17. An information reproducing method comprising
(i) a gain controlling method comprising:
an adjusting process of adjusting a gain of a generation signal, which is generated on the basis of a light reception signal obtained by receiving a reflection light of a light beam from an information recording medium;
a detecting process of detecting whether or not the generation signal is generated and outputting a detection signal when the generation signal is generated; and
a controlling process of controlling said adjusting process to increase the gain by a predetermined value set in advance when the detection signal is not outputted after a predetermined time period by said detecting process,
(ii) an optical pickup process of irradiating the light beam onto said information recording medium and receiving the reflection light to thereby output the light reception signal,
(iii) a signal generating process of generating the generation signal on the basis of the light reception signal outputted by said optical pickup process, and
(iv) a reproduction controlling process of controlling a reproduction of the information in accordance with the generation signal, the gain of which is adjusted by said adjusting process.

18. An information recording method comprising
(i) a gain controlling method comprising:
an adjusting process of adjusting a gain of a generation signal, which is generated on the basis of a light reception signal obtained by receiving a reflection light of a light beam from an information recording medium;
a detecting process of detecting whether or not the generation signal is generated and outputting a detection signal when the generation signal is generated; and
a controlling process of controlling said adjusting process to increase the gain by a predetermined value set in advance when the detection signal is not outputted after a predetermined time period by said detecting process,
(ii) an optical pickup process of irradiating the light beam onto said information recording medium and receiving the reflection light to thereby output the light reception signal,
(iii) a signal generating process of generating the generation signal on the basis of the light reception signal outputted by said optical pickup process,
(iv) a reproducing process of reproducing the information from said information recording medium on the basis of the generation signal, the gain of which is adjusted by said adjusting process, and
(v) a recording process of processing record information, which is to be recorded onto said information recording medium, on the basis of the reproduced information and recording the processed record information onto said information recording medium.

* * * * *